United States Patent Office 2,755,219
Patented July 17, 1956

2,755,219

2-(3,4-METHYLENEDIOXYPHENOXY) TETRAHYDROPYRAN AS A SYNERGIST FOR PYRETHRINS

Morton Beroza, Greenbelt, Md.

No Drawing. Application November 17, 1954,
Serial No. 469,573

7 Claims. (Cl. 167—33)

(Granted under Title 35, U. S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

The patent rights for the United States in any invention in the patent to be granted on this application are dedicated to the public.

This invention relates to a new compound, namely, 2(3,4-methylenedioxyphenoxy) tetrahydropyran, and to a process for its preparation. The invention relates further to insectidal compositions containing pyrethrins or pyrethrin-type compounds and the aforementioned new compound as a synergist therefor.

Pyrethrins and pyrethrin-type compounds, such as allethrin, are very useful due to their quick paralyzing or knockdown action on flies, gnats, mosquitoes and the like. In use, they are generally mixed with inert carriers in low concentrations because of their high cost. In many cases a synergist is added. Such synergists have little or no insecticidal property in themselves but increase the action of the pyrethrins or pyrethrin-type compounds and thereby effect a saving in the use of these expensive materials.

I have found that 2(3,4-methylenedioxyphenoxy) tetrahydropyran, having the formula

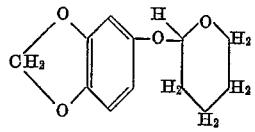

may be prepared as follows:

To 6.0 grams dihydropyran is added one small drop of a strongly acidic catalyst such as concentrated hydrochloric acid and, while stirring, 4 grams of sesamol is added within a few minutes. After stirring 5 minutes more, the solution is heated for 15 minutes at 70° C. The solution is taken up in 100 ml. ether and extracted three times with 10 ml. portions of 1 normal potassium hydroxide and three times with 10 ml. portions of water. After drying and evaporating the ether, the product is distilled in a molecular still. Yield 89%. Refractive index ($n_{25}{}^D$) 1.5347. Combustion analysis for carbon and hydrogen gave values of 65.21 per cent for carbon and 6.45 per cent for hydrogen which compares favorably with the theory of 64.9 and 6.35 per cent, respectively. The methylenedioxyphenoxy group is known to be attached in the 2-position of the tetrahydropyran ring because the compound splits off sesamol in the presence of mineral acids. Sesamol is detected by the red color it forms when an alcoholic solution containing 2 per cent furfural is added to the acid solution (Villavechia test). The splitting off of sesamol by mineral acids indicates that the compound is an acetal. If the methylenedioxyphenoxy group had been attached in the 3-position, the compound would not be split by mineral acids.

It is to be noted that the order of reacting the dihydropyran and catalyst with sesamol must be followed as described above to obtain high yield of product of the order of 89%. Varying this order of reactants produces a disproportionately and markedly low yield.

I have found further that the compound 2(3,4-methylenedioxyphenoxy) tetrahydropyran acts as a synergist for pyrethrins and synthetic pyrethrin-type compounds, such as allethrin. Such synergistic results are shown in the data in the following table. In the entomological tests on which these data are based, the turntable method was employed, 100 flies per test being used, and refined kerosene, in which the tetrahydropyran is very soluble, being used as the common solvent for the synergist and the respective pyrethrins and allethrins.

| Composition | Concentration, Percent | Average Percent Mortality After 24 Hours |
|---|---|---|
| Compound | 0.5 | 0 |
| Pyrethrins | 0.1 | 6 |
| Compound plus pyrethrins | 0.5+0.1 | 82 |
| Allethrin | 0.05 | 36 |
| Compound plus allethrin | 0.5+0.05 | 84 |

The proportions of the synergist and the pyrethrins and pyrethrin-type compound may be varied over a wide range. The preferred ranges, however, are about from .1 to 2% of the synergist to about from .02 to .2% of the pyrethrins, and from about .1 to 1% of the synergist to about from .01 to 1% of the pyrethrin-type compound.

The compositions may be formulated with other conventional materials commonly used in the insecticide art, such as carriers, toxic materials, and other additives.

What is claimed is:

1. 2(3,4-methylenedioxyphenoxy) tetrahydropyran.
2. A process of preparing 2(3,4-methylenedioxyphenoxy) tetrahydropyran in high yield comprising mixing a catalytic amount of a strongly acidic catalyst with dihydropyran and then reacting sesamol with the dihydropyran.
3. The process of claim 2 wherein the catalyst is concentrated hydrochloric acid.
4. An insecticidal composition comprising a member selected from the group consisting of pyrethrins and allethrin and 2(3,4-methylenedioxyphenoxy) tetrahydropyran as a synergist therefor.
5. An insecticidal composition comprising pyrethrins and 2(3,4-methylenedioxyphenoxy) tetrahydropyran as a synergist therefor.
6. An insecticidal composition comprising allethrin and 2(3,4-methylenedioxyphenoxy) tetrahydropyran as a synergist therefor.
7. A process of killing insects comprising contacting the insects with an insecticidal composition containing a member selected from the group consisting of pyrethrins and allethrin and 2(3,4-methylenedioxyphenoxy) tetrahydropyran as a synergist therefor.

References Cited in the file of this patent

UNITED STATES PATENTS

| 2,421,570 | La Forge | June 3, 1947 |
| 2,431,844 | Synerholm | Dec. 2, 1947 |
| 2,456,316 | Prill | Dec. 14, 1948 |
| 2,485,681 | Wachs | Oct. 25, 1949 |
| 2,514,168 | Smith et al. | July 4, 1950 |
| 2,521,366 | Hedenburg | Sept. 5, 1950 |
| 2,574,444 | Whetstone | Nov. 6, 1951 |
| 2,665,233 | Hedenburg | Jan. 5, 1954 |